United States Patent [19]
Casse et al.

[11] 3,754,248
[45] Aug. 21, 1973

[54] VISUAL DISPLAY DEVICE FOR RADAR SYSTEM

[75] Inventors: Robert Casse, Paris; Bernard Maitre, Maurepas; Claude Thomine-Desmazures, Saint-Cloud; Gerard Thouvenel, Croissy-sur-Seine, all of France

[73] Assignee: Electronique Marcel Dassault, Paris, France

[22] Filed: Mar. 17, 1971

[21] Appl. No.: 125,113

[52] U.S. Cl. ........... 343/5 R, 343/11 R, 343/112 PT
[51] Int. Cl. ............................................... G01s 7/04
[58] Field of Search ....................... 343/5 R, 7.9, 17, 343/112 PT, 11 R

[56] References Cited
UNITED STATES PATENTS

| | | | |
|---|---|---|---|
| 2,991,445 | 7/1961 | Haynes et al. | 343/5 R X |
| 3,437,873 | 4/1969 | Eggert | 315/22 |
| 3,683,373 | 8/1972 | Barnes et al. | 343/11 R X |
| 3,177,486 | 4/1965 | Crooker | 343/7.9 |
| 3,060,426 | 10/1962 | Williams | 343/112 PT |
| 3,321,758 | 5/1967 | Elliott | 343/7.9 |

*Primary Examiner*—T. H. Tubbesing
*Attorney*—Karl F. Ross

[57] ABSTRACT

A visual display device for radar systems comprises a panel including a plurality of juxtaposed light indicators, each such indicator being formed by one or more lamps, and means for selectively operating the light indicators as a function of the position(s) of one or more detected targets in the area being scanned by the radar. The display device has two modes of operation : a first mode of operation (watch mode) in which the plurality of indicators is associated to the whole of the area being scanned and a second or "precise locating mode" of operation in which the plurality of indicators is associated to a portion only of the area being scanned thereby taking full advantage of the power of resolution and discrimination of the radar system.

9 Claims, 6 Drawing Figures

Robert CASSE
Bernard MAITRE
Claude THOMINE-DESMAZURES
Gérard THOUVENEL
  INVENTORS BY  Karl J. Ross Attorney

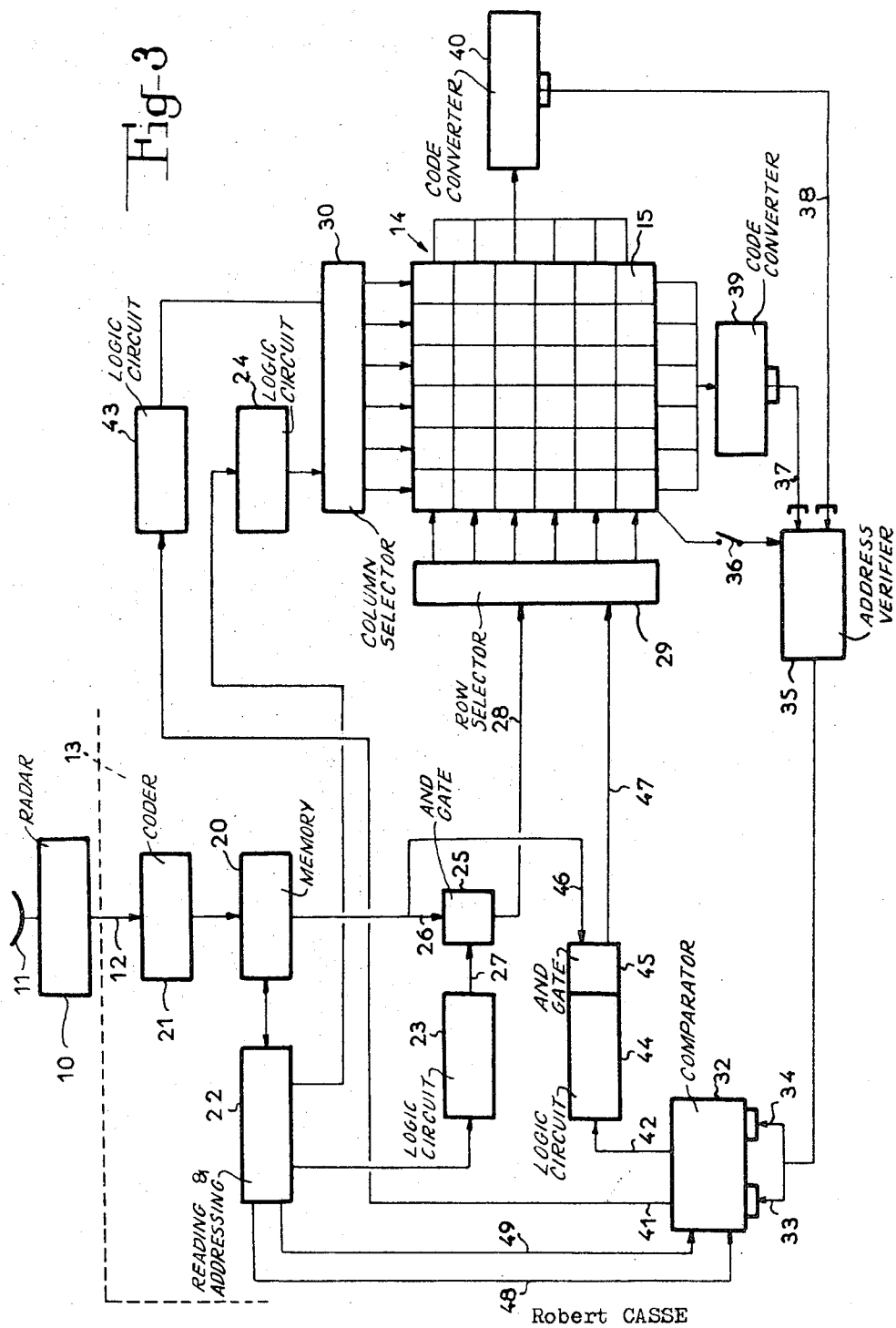

PATENTED AUG 21 1973

|  | $G_1$ +$G_2$ +$G_3$ +$G_4$ +$G_5$ +$G_6$ | $G_7$ +$G_8$ +$G_9$ +$G_{10}$ +$G_{11}$ +$G_{12}$ | $G_{13}$ +$G_{14}$ +$G_{15}$ +$G_{16}$ +$G_{17}$ +$G_{18}$ | $G_{19}$+$G_{20}$+$G_{21}$+$G_{22}$+$G_{23}$+$G_{24}$ | $G_{25}$+$G_{26}$+$G_{27}$+$G_{28}$+$G_{29}$+$G_{30}$ | $G_{31}$+$G_{32}$+$G_{33}$+$G_{34}$+$G_{35}$+$G_{36}$ |
|---|---|---|---|---|---|---|
| $D_1$ +$D_2$ +$D_3$ +$D_4$ +$D_5$ +$D_6$ |  |  |  |  |  |  |
| $D_7$ +$D_8$ +$D_9$ +$D_{10}$+$D_{11}$+$D_{12}$ |  |  |  |  |  |  |
| $D_{13}$+$D_{14}$+$D_{15}$+$D_{16}$+$D_{17}$+$D_{18}$ |  |  |  |  |  |  |
| $D_{19}$+$D_{20}$+$D_{21}$+$D_{22}$+$D_{23}$+$D_{24}$ |  |  |  |  |  |  |
| $D_{25}$+$D_{26}$+$D_{27}$+$D_{28}$+$D_{29}$+$D_{30}$ |  |  |  |  |  |  |
| $D_{31}$+$D_{32}$+$D_{33}$+$D_{34}$+$D_{35}$+$D_{36}$ |  |  |  |  |  |  |

Fig-6

|  | $G_1 \oplus G_7 \oplus G_{13} \oplus G_{19} \oplus G_{25} \oplus G_{31}$ | $G_2 \oplus G_8 \oplus G_{14} \oplus G_{20} \oplus G_{26} \oplus G_{32}$ | $G_3 \oplus G_9 \oplus G_{15} \oplus G_{21} \oplus G_{27} \oplus G_{33}$ | $G_4 \oplus G_{10} \oplus G_{16} \oplus G_{22} \oplus G_{28} \oplus G_{34}$ | $G_5 \oplus G_{11} \oplus G_{17} \oplus G_{23} \oplus G_{29} \oplus G_{35}$ | $G_6 \oplus G_{12} \oplus G_{18} \oplus G_{24} \oplus G_{30} \oplus G_{36}$ |
|---|---|---|---|---|---|---|
| $D_1 \oplus D_7 \oplus D_{13} \oplus D_{19} \oplus D_{25} \oplus D_{31}$ |  |  |  |  |  |  |
| $D_2 \oplus D_8 \oplus D_{14} \oplus D_{20} \oplus D_{26} \oplus D_{32}$ |  |  |  |  |  |  |
| $D_3 \oplus D_9 \oplus D_{15} \oplus D_{21} \oplus D_{27} \oplus D_{33}$ |  |  |  |  |  |  |
| $D_4 \oplus D_{10} \oplus D_{16} \oplus D_{22} \oplus D_{28} \oplus D_{34}$ |  |  |  |  |  |  |
| $D_5 \oplus D_{11} \oplus D_{17} \oplus D_{23} \oplus D_{29} \oplus D_{35}$ |  |  |  |  |  |  |
| $D_6 \oplus D_{12} \oplus D_{18} \oplus D_{24} \oplus D_{30} \oplus D_{36}$ |  |  |  |  |  |  |

Robert CASSE
Bernard MAITRE
Claude THOMINE-DESMAZURES
Gérard THOUVENEL
INVENTORS

BY

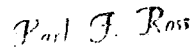
Attorney

VISUAL DISPLAY DEVICE FOR RADAR SYSTEM

The present invention concerns radar systems and in particular visual display devices forming part of these systems.

It is known that the data produced by a radar system relative to targets detected in the course of scanning with a UHF electron beam are generally visually displayed on the screen of a cathode-ray tube in the form of luminous spots, the brightness of which is a function of the energy of the picked-up echo and the position of which on the screen gives information about the position of the target with respect to the observation station usually by an angular indication and a distance indication.

Such known visual display devices are relatively large in size including the cathode-ray tube per se as well as its accessories, such as the electrostatic deflection plates and rotary coils sometimes used in place of said plates. The operation of these devices requires a relatively large power supply, in particular for supplying the very high voltage and heating the cathode-ray tube.

On the other hand, the differences in the energy levels of the signals delivered by the radar and the energy levels required at the input of the cathode-ray tube make it necessary to provide amplification or adaptation stages preceding the visual display device, in particular when the radar system has integrated circuits and/or semiconductors.

The visual display device for radar data according to the present invention overcomes these drawbacks. The device is lightweight and small in size and can be easily and directly associated with radar systems employing semiconductors and/or integrated circuits. Further, it has a high reliability.

One aspect of the invention consists in a visual display device for radar data provided by a radar system relative to a target comprising a plurality of distinct light indicators and means for selectively rendering operative said indicators as a function of the position(s) of one or more detected targets.

In a preferred embodiment according to the invention, the light indicators comprise juxtaposed signal lights grouped as a mosaic forming a rectangular or square panel.

According to another feature of the device according to the invention, means are provided for associating the combination of the signal lights of the panel or mosaic to the entire area being scanned by the radar beam or simply, at will to a portion thereof thereby taking full advantage of the discrimination or resolution power of the radar with a panel having a relatively small number of signal lights.

The device according to the invention therefore has two modes of operation. In a first mode of operation, the whole of the mosaic of signal lights is allocated to the entire area being scanned by the radar beam, the portion of the area in which the target(s) are found being determined, means being provided for controlling the transition to a second mode of operation in which the whole of the mosaic of signal lights is allocated to the said portion of the area thereby enabling a precise location of the target(s) detected.

A further feature of the device according to the invention consists in the use of means for digitizing radar data and means for storing data represented in digital form such as the energy of the returned echo, the distance between the radar system and the target, an angular position, and possibly the speed of the target relative to the radar system, etc., such data being used to control the signal lights of the visual display device.

The invention will be fully understood from the description made by way of example with reference to the accompanying drawings, in which:

FIG. 3 shows a block diagram of the lighting control means of the light indicators;

FIGS. 5 and 6 show explanatory schematic diagrams.

Figure 1:
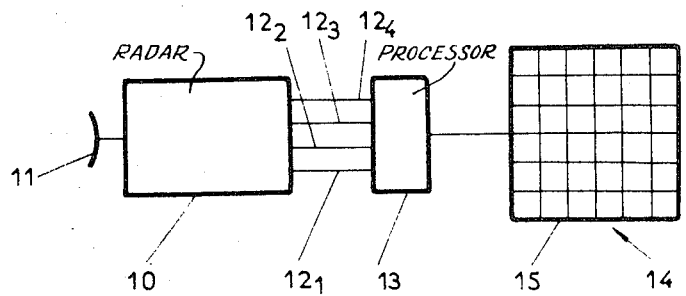
FIG. 1 shows very schematically a radar system including a device according to the invention.

A radar system 10 (FIG. 1) comprising an aerial 11 provides at its outputs $12_1$, $12_2$, $12_3$, $12_4$ during the scanning of the beam and for a detected target electric signals representing, for example, the distance between the radar system and the target, the angular position of the target with respect to a fixed reference, the energy of the returned echo and the relative speed of the target with respect to the radar system.

In a conventional visual display device with a cathode-ray tube (FIG. 2), these electric signals control the appearance of a luminous spot C, the brightness of which is a function of the returned echo and the position of which on the screen given information on the position of the target by an angular measurement $g$ relative to an X-axis and by a distance indication $d$ measured by the length of the line OC. On such a screen two targets provide distinct spots only if they are angularly separated by a value greater than a threshold value $g_0$ and if they are linearly separated by a value greater than a threshold value $d_0$.

In the device according to the present invention, the data produced by the radar system 10 is displayed, after processing in a device 13 (FIG. 1) on a panel 14 comprising a plurality of distinct juxtaposed light indicators 15 forming a square or rectangular mosaic. In a first mode of operation the device 13 is adapted to associate each indicator 15 with a portion of the area being scanned by the radar beam of the system, in order to render such an indicator operative when one or more targets are detected in the portion of the area which corresponds to the image on the screen of the customary cathode-ray tube visual display device which is limited by two angular values $g_1$ and $g_2$ and two distance values $d_1$ and $d_2$ such as shown by the shaded zone in FIG. 2.

The device 13 comprises a coder 21 (FIG. 3) which for each detected target transforms the signals provided at the output 12 of the radar system 10 into digitally coded data representing, for example, the energy of the echo. Said coded data is carried to a memory 20 having a capacity sufficient for storing all the data provided by the radar system, the memory advantageously being of the digital type with semiconductors. The address of the data in the memory is a function of the position of the detected target.

According to a preferred embodiment, the memory device 20 comprises two series memory $S_1$ and $S_2$ of the MOS type. Memory $S_1$ receives at its input $e_1$ angle coded data and distance coded data relative to the detected target in a predetermined order, as well as a digit 0 or 1 allocated to the determination of the energy of the returned radar echo for each of the targets. Memory $S_2$ also receives at its input $e_2$ a digit 1 or 0 allocated to the determination of the energy of the returned echo which is stored in said memory corresponding to the position of the angle and distance data relative to the target stored in memory $S_1$. During the read-out of memories $S_1$ and $S_2$, the presence or absence of digits in the same positions in the memories provides at the outputs information concerning the energy of the returned echo ; the read-out of memory $S_1$ also provides information on the angle and the distance of the target with respect to the radar station.

In another embodiment, the memory device 20 has a random input and is formed, for example, as a memory with ferrite cores, the energy of the returned echo being stored in each of the elements thereof, the data address being related to the position of the detected target.

In either case, the memory is reset with each new scanning of the beam of the radar system.

A reading and addressing device 22 is associated with the memory 20 and controls a first logic circuit 23 and a second logic circuit 24 adapted to group a predetermined number of bits of data on distance and angle, in a first operating mode.

If $D_i$ designates the coded data corresponding to the presence of a target at a distance $i$ and if $G_j$ designates the coded data corresponding to the presence of a target on a radial vector making an angle $j$ with the O axis, the circuit 23 and a "AND" device 25, receiving at its input 26 information stored in the memory and receiving at another input 27 signals coming from the logic circuit 23, carry out the logic operation schematically illustrated in FIG. 5. In the case where a mosaic 14 comprises 36 elements, the distance data between $D_1$ and $D_6$ is associated to the first row of the mosaic 14, the distance data between $D_7$ and $D_{12}$ is associated to the second row of the matrix 14 and so on, the distance coded data between $D_{31}$ and $D_{36}$ being grouped to be associated to the last row of the matrix 14. In the schematic showing in FIG. 5, the + sign corresponds to the "OR" logic operation.

Similarly, the circuit 24 associates the angle coded data whose value is between $G_1$ and $G_6$ to the first column of the matrix 14, the angled coded data whose value is between $G_7$ and $G_{12}$ to the second column of the mosaic, and so on, up to the angled coded data whose value is between $G_{31}$ and $G_{36}$ to the last column of the matrix 14.

The logic circuits 23 and 24 are thus adapted to associate a portion of the field scanned by the beam of the radar system 10 with an element of the mosaic or matrix 14.

The circuit 23 controls by its output 28 a device 29 adapted to render one of the rows of light indicators of the mosaic or matrix 14 operative. Similarly, the logic circuit 24 controls a device 30 adapted to render one of the columns of the matrix of indicators 15 operative.

These indicators are formed as signal lights, each comprising one or more incandescent lamps of the same or different colours for visually presenting the energy of the echo, by lighting one or more lamps or even the nature of the echo when an echo identifying device of the IFF type is associated with the radar, for example by lighting a lamp of a different colour.

Alternatively, the energy of the echo is visually presented by varying or modulating the luminous power, for example by a variable electric voltage or a constant electric voltage with a variable shape factor.

In another embodiment, the elements 15 comprise semiconductor luminous devices (electroluminescent diodes) of the same or different colour for providing an indication of energy of the echo and its nature, as indicated above.

In a preferred embodiment each element 15 is formed as a luminous push-button.

In a first or "watch" mode of operation as described above, the whole of the mosaic 14 is allocated to the entire field being scanned by the radar beam.

The data stored in the memory 20 is systematically and cyclically addressed on the same time basis as the read-out of the memory by the device 22. In this mode of operation when a plurality of echoes are detected in the portion of the field scanned associated with the same element 15, only the echo having the greatest intensity is taken into account in order to bring about the lighting of said element.

One or more targets having been detected in the "watch" mode of operation, the present device permits the more precise location of the target(s) by allocating the entire mosaic of indicator lights 15 to the portion of the field in which has been discovered one or more echos, thereby taking advantage of the discrimination or resolution power of the radar system.

To this end, the addressing and reading device 22 of the memory 20 is connected by the lines 48 and 49 to a comparator 32 which receives on inputs 33 and 34 signals from an address validating device 35 which is made operative by the actuation of the switch 36 and which receives at its inputs 37 and 38 the signals from the code converting device 39 for column number of the matrix 14 and a code converting device 40 for the row number of said matrix respectively. The comparator 32 provides at its outlets 41 and 42 a logic circuit 43 control signal for processing a column address and a logic circuit 44 control signal for processing a row address, respectively. The logic circuit 43 controls the device 30 adapted to render a column of elements 15 operative and the logic circuit 44, followed by a "AND" device 45 which receives at an input 46 the signals originating from memory 20, provides on its output 47 a control signal for the device 29 adapted to render operative a row of elements 15.

The closing of the switch 36 which permits the transition from the condition in which the whole of the mosaic is allocated to the entire radar field to the condition in which the whole of the mosaic is allocated to a portion only of the field, or "precise location" mode of operation. When the elements comprising the mosaic are constructed as luminous pushbuttons 15 actuation of one of these buttons, advantageously the one lit up in the watch mode, switches the apparatus to the "precise location" mode of operation.

Alternatively, the switch 36 is optically controlled by a pencil of light acting on a photoelectric cell housed in an element 15.

In a further alternative embodiment, the switch 36 is controlled by the displacement of a luminous marker by acting on a "broom-stick" lever.

In the "precise location" mode of operation, the devices 32, 35, 39 and 40 define an addressing for the readout of the memory 20 whose data is displayed by means of logic devices 43 and 44 on the whole of the mosaic 14. In this mode of operation the lighting combinations of one of the elements 15 of the mosaic are defined by the table of FIG. 6 in which the symbol ⊕ signifies the logic operation "or exclusively".

Figure 2:
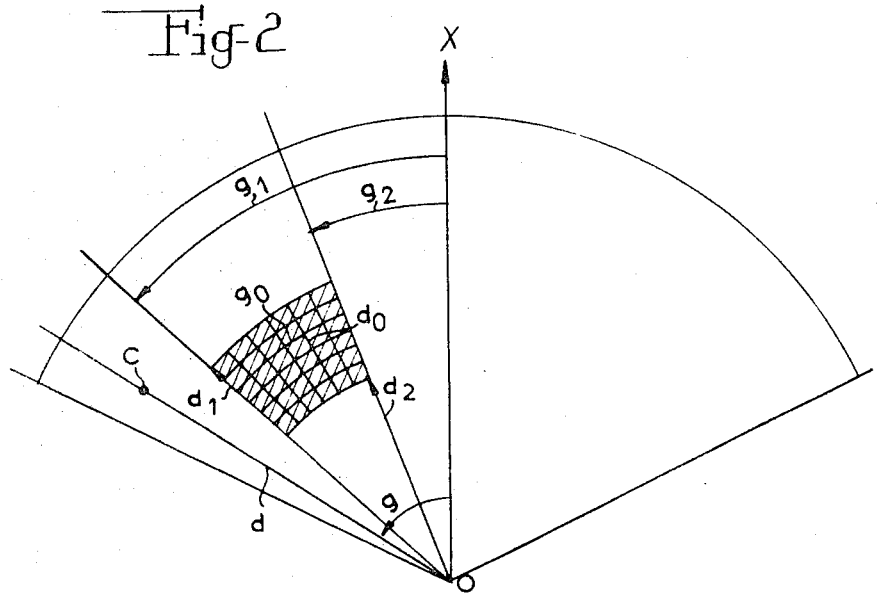
FIG. 2 shows an explanatory schematic diagram.
Figure 4:
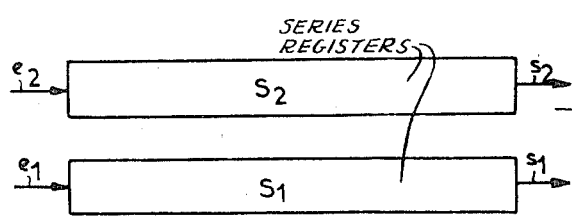
FIG. 4 shows a schematic diagram of a memory device.

As will be apparent from FIGS. 5 and 6, the digital data $D_1$-$D_{36}$ and $G_1$-$G_{36}$ identify $n^2$ different target positions ($n = 36$ in this instance) corresponding to the elemental areas within the shaded zone of FIG. 2. The subregion of the scanning sweep represented by this shaded zone is one of n such subregions, each assigned to one of the 36 squares of the array 14 in the "monitoring" condition of FIG. 5. Thus, for example, the square in the upper left corner of the array of FIG. 5 represents the subregion encompassing the 36 elemental arrays defined by distance increments $D_1$-$D_6$ and angle increments $G_1$-$G_6$; the subregion represented by the opposite corner of the array (lower right) is defined by distance increments $D_{31}$-$D_{36}$ and angle increments $G_{31}$-$G_{36}$.

With each subregion divided in turn into $n = 36$ elemental areas, each of the latter can be assigned to a respective square of the array in the "pinpointing" condition of FIG. 6. Thus, if the first subregion ($D_1$-$D_6$, $G_1$-$G_6$) represented by the upper left corner of the array 14 in FIG. 5 is selected (by operation of a pushbutton or illumination of a photocell as described above), the output circuitry 35, 39, 40 of panel 14 selects the corresponding positional information, i.e., data $D_1$-$D_6$, $G_1$-$G_6$ in memory 20, for illumination of any of its light sources 15 under the control of row selector 29 and column selector 30 to identify the particular elemental area of a target in that subregion by actuating the corresponding light source 15. Thus, if a target illuminating the upper-left square in FIG. 14 is located at the lower lefthand corner of its subregion, the corresponding square in FIG. 6 will be illuminated in response to positional data $D_6$ and $G_1$. If the target were present at the upper right-hand corner of the subregion represented by the lower right-hand square in FIG. 5, the controlling data for the array of FIG. 6 would be the distance code $D_{31}$ and the angle code $G_{36}$.

The device according to the invention therefore fully takes advantage of the power of resolution of the radar system while at the same time limiting the size of the visual display panel.

What is claimed is:

1. A device for visually displaying information relating to a target detected by echo signals of a radar system, comprising:

an array of light sources representing a region scanned by the radar system, said region having a multiplicity of subregions each divided into a multiplicity of elemental areas, the number of said light sources equaling that of said subregions;

memory means for receiving and storing target information from said radar system, said information including digital data identifying the elemental area of a detected target within said region;

control means responsive to the information stored in said memory means for selectively actuating a light source whose position in said array is determined by said digital data, said control means having a first operating condition in which each light source is assigned to a respective subregion and a second operating condition in which different light sources of said array are assigned to respective elemental areas of a selected subregion; and switchover means for changing from said first operating condition to said second operating condition with selection of a subregion identified by an operative light source on said array.

2. A device as defined in claim 1 wherein the number of digital data storable in said memory means, identifying respective elemental areas of said region, equals $n^2$ where n is the number of said light sources whereby each of said light sources is assignable to a respective elemental area of n such elemental areas in any one of n subregions.

3. A device as defined in claim 1 wherein said array is provided with output means identifying an operative light source thereof, said control means including an address comparator responsive to said output means in said second operating condition for selecting the stored data relating to the subregion represented by said operative light source.

4. A device as defined in claim 3 wherein said array is orthogonally divided into rows and columns, said control means including a row selector and a column selector, said output means including a first code converter and a second code converter respectively identifying the row and the column of said operative light source.

5. A device as defined in claim 3 wherein said switchover means comprises a plurality of switches individually associated with said light sources.

6. A device as defined in claim 5 wherein said switches are pushbuttons.

7. A device as defined in claim 5 wherein said switches are individually illuminable photoelectric cells.

8. A device as defined in claim 1 wherein said light sources comprise differently colored lamps for indicating different characteristics of the detected target.

9. A device as defined in claim 1 wherein said memory means comprises a first register for the storage of positional data and a second register for the concurrent storage of echo signals relating to target positions determined by said positional data.

* * * * *